United States Patent
Ohashi et al.

(10) Patent No.: US 10,781,281 B2
(45) Date of Patent: Sep. 22, 2020

(54) RESIN FOR INK AND INK

(71) Applicant: HARIMA CHEMICALS, INCORPORATED, Kakogawa-shi, Hyogo (JP)

(72) Inventors: Yasunori Ohashi, Hyogo (JP); Hiroyuki Hisada, Hyogo (JP); Lin Zhou, Hyogo (JP); Maiko Yamamoto, Hyogo (JP)

(73) Assignee: HARIMA CHEMICALS, INCORPORATED, Kakogawa-Shi, Hyogo (JP)

( * ) Notice: Subject to any disclaimer, the term of this patent is extended or adjusted under 35 U.S.C. 154(b) by 0 days.

(21) Appl. No.: 16/244,570

(22) Filed: Jan. 10, 2019

(65) Prior Publication Data

US 2019/0144591 A1 May 16, 2019

Related U.S. Application Data

(62) Division of application No. 15/561,862, filed as application No. PCT/JP2016/056023 on Feb. 29, 2016, now abandoned.

(30) Foreign Application Priority Data

Mar. 31, 2015 (JP) .................. 2015-070997

(51) Int. Cl.
*C08G 8/34* (2006.01)
*C09D 11/103* (2014.01)
*C09D 11/08* (2006.01)
*C09D 161/14* (2006.01)

(52) U.S. Cl.
CPC ............. *C08G 8/34* (2013.01); *C09D 11/08* (2013.01); *C09D 11/103* (2013.01); *C09D 161/14* (2013.01)

(58) Field of Classification Search
CPC ........ C08G 8/34; C09D 11/08; C09D 11/103; C09D 161/14
See application file for complete search history.

(56) References Cited

U.S. PATENT DOCUMENTS

| 4,612,051 A | 9/1986 | Miller, Jr. et al. |
| 2004/0242837 A1 | 12/2004 | Toyoda et al. |
| 2006/0083766 A1 | 4/2006 | Miyata et al. |
| 2011/0098384 A1 | 4/2011 | Blount |

FOREIGN PATENT DOCUMENTS

| CN | 1817994 A | 8/2006 |
| JP | 2002-322411 A | 11/2002 |
| JP | 2004-352782 A | 12/2004 |
| JP | 2006-111600 A | 4/2006 |
| JP | 2006-112004 A | 4/2006 |
| JP | 2006-520418 A | 9/2006 |
| JP | 2016-155907 A | 9/2016 |
| WO | 2015/056758 A | 4/2015 |

OTHER PUBLICATIONS

Machine translation of CN 1817994 A, Cheng Xiansu Gao, Aug. 2006, p. 1-8.*
International Search Report (PCT/ISA/210) dated May 24, 2016, by the Japanese Patent Office as the International Searching Authority for International Application No. PCT/JP2016/056023.
Written Opinion (PCT/ISA/237) dated May 24, 2016, by the Japanese Patent Office as the International Searching Authority for International Application No. PCT/JP2016/056023.
PCT International Preliminary Report on Patentability (IPRP) and Written Opinion dated Oct. 12, 2017, in corresponding International Application No. PCT/JP2016/056023 (8 pages).

* cited by examiner

*Primary Examiner* — Robert S Jones, Jr.
(74) *Attorney, Agent, or Firm* — Buchanan Ingersoll & Rooney PC

(57) ABSTRACT

A method for producing a resin for ink which includes reacting a lignin, a phenol, and an aldehyde so as to obtain a lignin-containing resol phenolic resin; and reacting the obtained lignin-containing resol phenolic resin with a rosin-based resin, and polyhydric alcohol.

2 Claims, No Drawings

RESIN FOR INK AND INK

CROSS REFERENCE TO RELATED APPLICATIONS

The present application is a divisional of U.S. application Ser. No. 15/561,862, filed on Sep. 26, 2017, now abandoned, which is a U.S. national stage of International Application No. PCT/JP2016/056023, filed on Feb. 29, 2016, which claims the benefit of Japanese Application No. 2015-070997, filed on Mar. 31, 2015. The entire contents of each of U.S. application Ser. No. 15/561,862, International Application No. PCT/JP2016/056023, and Japanese Application No. 2015-070997, are hereby incorporated herein by reference in their entirety.

TECHNICAL FIELD

The present invention relates to a resin for ink and ink, more specifically, a resin for ink and ink containing the resin for ink.

BACKGROUND ART

Conventionally, printing ink used in offset printing or the like contains, for example, a varnish containing a resin for ink such as a rosin-modified phenolic resin, a rosin ester resin, a maleic acid resin, a petroleum resin, and an alkyd resin and colorant (pigment).

More specifically, a varnish containing a rosin-modified phenolic resin ("d" component), which is a reaction product of a resol resin ("a" component) having a phenol average nucleus number of 6 to 10, a condensation product ("b" component) of rosin and/or rosin and an unsaturated carboxylic acid, and polyhydric alcohol ("c" component) and has a weight average molecular weight of 40,000 to 200,000, and printing ink containing the varnish have been proposed (see Patent Document 1).

CITATION LIST

Patent Document

Patent Document 1: Japanese Unexamined Patent Publication No. 2002-322411

SUMMARY OF THE INVENTION

Problems to be Solved by the Invention

Meanwhile, ink is required not to be scattered at the time of its use, that is, to have misting resistance. Scattering (misting) at the time of the use usually easily occurs in a case where the elasticity and the viscosity of ink are low, so that a certain degree of elasticity and viscosity of the ink are required in order to obtain excellent misting resistance. There is, however, a disadvantage that in the case of excessively high viscosity (tackiness) of the ink, the printing properties (gloss or the like) are poor.

An object of the invention is, therefore, to provide a resin for ink capable of ensuring excellent printing properties and improving misting resistance and ink containing the resin for ink.

Means for Solving the Problem

The invention [1] includes a resin for ink, wherein the resin for ink is obtained by reaction of a lignin, phenols, aldehydes, a rosin-based resin, and polyhydric alcohol.

The invention [2] includes the resin for ink as described in the above [1], wherein the resin for ink is obtained by reaction of a lignin-containing resol-type phenolic resin obtained by reaction of the lignin, the phenols, and the aldehydes; the rosin-based resin; and the polyhydric alcohol.

The invention [3] includes the resin for ink as described in the above [2], wherein the lignin-containing resol-type phenolic resin is obtained by allowing a phenol-modified lignin obtained after allowing the lignin to react with the phenols under the presence of an acid catalyst to react with the aldehydes under the presence of an alkali catalyst.

The invention [4] includes the resin for ink as described in any one of the above [1] to [4], wherein the lignin is modified with acetic acid.

The invention [5] includes the ink containing the resin for ink as described in any one of the above [1] to [4].

Effect of the Invention

According to the resin for ink and the ink of the invention, excellent printing properties are ensured and improvement of misting resistance can be achieved.

EMBODIMENT OF THE INVENTION

A resin for ink of the invention is obtained by reaction of a lignin, phenols, aldehydes, a rosin-based resin, and polyhydric alcohol.

Lignins are polymeric phenolic compounds having a basic skeleton such as guaiacyl lignin (G type), syringyl lignin (S type), p-hydroxyphenyl lignin (H type), or the like, which are contained in many plants. As such lignins, known are soda lignin, sulfite lignin, kraft lignin, and the like, which are contained in a waste liquor (black liquor) discharged during manufacturing pulp from plant raw materials, for example, through a soda process, a sulfite process, a kraft process, or the like.

Specific examples of the lignins include arboreous plant-derived lignins and herbaceous plant-derived lignins.

Examples of the arboreous plant-derived lignins include softwood lignins contained in softwoods (for example, Japanese cedar) and hardwood lignins contained in hardwoods. Such arboreous plant-derived lignins do not contain lignin having an H type as a basic skeleton. For example, softwood lignins have a G type as a basic skeleton, while hardwood lignins have a G type and an S type as a basic skeleton.

Examples of the herbaceous plant-derived lignins include gramineous lignins contained in gramineous plants (such as wheat straw, rice straw, corn, and bamboo). These herbaceous plant-derived lignins have all of an H type, a G type, and an S type as the basic skeleton thereof.

These lignins may be used either singly or in combination of two or more.

As the lignin, herbaceous plant-derived lignins are preferred, with herbaceous plant-derived lignins derived from corn stover (cobs, stalks, leaves, and the like of a maize) being more preferred.

As the lignin, from the standpoint of reactivity, that containing an H type as the basic skeleton thereof in an amount of 3 mass % or more is preferred, with that containing in an amount of 9 mass % or more being more preferred and that containing in an amount of 14 mass % or more being further more preferred.

The lignin is preferably modified with a carboxylic acid. That is, as the lignin, a lignin that is modified with a carboxylic acid (which may hereinafter be called "carboxylic acid-modified lignin") is preferably used.

In the carboxylic acid-modified lignin, examples of the carboxylic acid include carboxylic acids having one carboxy group (which may hereinafter be called "monofunctional carboxylic acid"). Specific examples thereof include saturated aliphatic monofunctional carboxylic acids, unsaturated aliphatic monofunctional carboxylic acids, and aromatic monofunctional carboxylic acids.

Examples of the saturated aliphatic monofunctional carboxylic acids include acetic acid, propionic acid, butyric acid, and lauric acid.

Examples of the unsaturated aliphatic monofunctional carboxylic acids include acrylic acid, methacrylic acid, and linoleic acid.

Examples of the aromatic monofunctional carboxylic acids include benzoic acid, 2-phenoxybenzoic acid, and 4-methylbenzoic acid.

These carboxylic acids may be used either singly or in combination of two or more.

The carboxylic acid is preferably a saturated aliphatic monofunctional carboxylic acid, more preferably acetic acid (in other words, as a lignin, a lignin modified with acetic acid is used). Using the above-mentioned carboxylic acid enables easy preparation of a carboxylic acid-modified lignin. The carboxylic acid-modified lignin thus obtained has, as described later, relatively high solubility in an organic solvent. In addition, it is capable of melting at a relatively low temperature (from about 100 to 200° C.), so that it is also excellent in ease of handling.

The carboxylic acid can be also prepared as an aqueous solution. In such a case, the concentration of the aqueous solution of the carboxylic acid is not particularly limited and is determined as needed.

A production method of a carboxylic acid-modified lignin is not particularly limited and can be based on a known method.

Described specifically, a carboxylic acid-modified lignin can be obtained as a pulp waste liquor by using a carboxylic acid (preferably, acetic acid) to digest a plant material (for example, softwood, hardwood, or gramineous plant) which will become a raw material of a lignin.

Although the digesting method is not particularly limited, for example, it is performed by mixing a plant material which will become a raw material of a lignin, with a carboxylic acid and an inorganic acid (for example, hydrochloric acid or sulfuric acid) to allow them to react.

The mixing ratio of the carboxylic acid (in terms of 100%) with respect to 100 parts by mass of the plant material which becomes a raw material of the lignin is, for example, 500 parts by mass or more, preferably 900 parts by mass or more and for example, 30000 parts by mass or less, preferably 15000 parts by mass or less.

The mixing ratio of the inorganic acid (in terms of 100%) with respect to 100 parts by mass of the plant material which becomes a raw material of the lignin is, for example, 0.01 part by mass or more, preferably 0.05 part by mass or more and for example, 10 parts by mass or less, preferably 5 parts by mass or less.

With regard to reaction conditions, the reaction temperature is, for example, 30° C. or more, preferably 50° C. or more and for example, 400° C. or less, preferably 250° C. or less. The reaction time is, for example, 0.5 hour or more, preferably 1 hour or more and for example, 20 hours or less, preferably 10 hours or less.

By such digestion, a pulp can be obtained and also a carboxylic acid-modified lignin can be obtained as a pulp waste liquor.

Next, in this method, the pulp is separated by a known separation method such as filtration to collect filtrate (pulp waste liquor) and if necessary, the carboxylic acid which has remained unreacted is removed (distilled off) by a known method using, for example, a rotary evaporator or vacuum distillation. Then, a large excess of water is added to precipitate the carboxylic acid-modified lignin, followed by filtration to obtain the carboxylic acid-modified lignin as a solid component.

The method of obtaining a carboxylic acid-modified lignin is not limited to the above-mentioned method. For example, a carboxylic acid-modified lignin can be obtained by allowing a lignin which is not modified with a carboxylic acid (which will hereinafter be called "unmodified lignin") to react with a carboxylic acid.

In such a method, the unmodified lignin is preferably in powder form.

The unmodified lignin powder has an average particle size of, for example, 0.1 µm or more, preferably 5 µm or more and for example, 1000 µm or less, preferably 500 µm or less.

When the unmodified lignin powder has an average particle size falling within the above-mentioned range, it can be dispersed well in the carboxylic acid without causing agglomeration.

The unmodified lignin powder can be obtained by drying and grinding a massive unmodified lignin in a known manner. Alternatively, a commercially available unmodified lignin powder can be used.

A reaction between the unmodified lignin and the carboxylic acid is made, for example, by mixing the unmodified lignin with the carboxylic acid and an inorganic acid (for example, hydrochloric acid or sulfuric acid) to allow them to react.

The mixing ratio of the carboxylic acid (in terms of 100%) with respect to 100 parts by mass of the unmodified lignin is, for example, 300 parts by mass or more, preferably 500 parts by mass or more and for example, 15000 parts by mass or less, preferably 10000 parts by mass or less.

The mixing ratio of the inorganic acid (in terms of 100%) with respect to 100 parts by mass of the unmodified lignin is, for example, 0.01 part by mass or more, preferably 0.05 part by mass or more and for example, 10 parts by mass or less, preferably 5 parts by mass or less.

With regard to reaction conditions, the reaction temperature is, for example, 30° C. or more, preferably 50° C. or more and for example, 400° C. or less, preferably 250° C. or less. The reaction time is, for example, 0.5 hour or more, preferably 1 hour or more and for example, 20 hours or less, preferably 10 hours or less.

The carboxylic acid-modified lignin thus obtained is excellent in ease of handling.

This means that a lignin not modified with a carboxylic acid has relatively low solubility in an organic solvent and in addition, it does not melt, so that it is inferior in ease of handling in some applications.

The lignin modified with the carboxylic acid as described above has relatively high solubility in an organic solvent (for example, esters such as methyl acetate, ethyl acetate, butyl acetate, and isobutyl acetate; ketones such as acetone, methyl ethyl ketone, methyl isobutyl ketone, and cyclohexanone; aliphatic alcohols such as methanol; phenols such as phenol, cresol, and bisphenol A; ethers such as diethyl ether, tetrahydrofuran, and dioxane; glycol ether esters such as methyl cellosolve acetate, ethyl cellosolve acetate, methyl carbitol acetate, ethyl carbitol acetate, ethylene glycol ethyl ether acetate, propylene glycol methyl ether acetate, 3-methyl-3-methoxybutyl acetate, and ethyl-3-ethoxypropionate; nitriles such as acetonitrile; and in addition, polar solvents such as N-methylpyrrolidone, N,N-dimethylformamide, N,N-dimethylacetamide, dimethylsulfoxide, and hexamethyl phosphonyl amide) and is capable of melting at a relatively low temperature (from about 100 to 200° C.), so that it is excellent in ease of handling.

Thus, the carboxylic acid-modified lignin can be also used as a solution of the above-mentioned organic solvent. In such a case, the concentration of the carboxylic acid-modified lignin in the solution is, for example, 10 mass % or more, preferably 30 mass % or more.

The carboxylic acid-modified lignin has an average particle size of, for example, 0.1 µm or more, preferably 5 µm or more and for example, 2 cm or less, preferably 1 cm or less.

The lignin (preferably, carboxylic acid-modified lignin) has a phenolic hydroxyl group equivalent of, for example, 100 g/eq or more, preferably 300 g/eq or more and for example, 1700 g/eq or less, preferably 1350 g/eq or less.

The phenolic hydroxyl group equivalent is obtained in conformity with Examples to be described later.

The carboxylic acid-modified lignin may be obtained as a mixture of a component (soluble component) capable of being dissolved with the above-mentioned organic solvent (preferably, ethyl acetate) and a component (insoluble component) incapable of being dissolved with the above-mentioned organic solvent.

In such a case, as the carboxylic acid-modified lignin, a mixture of the soluble component and the insoluble component (which will hereinafter be called "crude carboxylic acid-modified lignin") can be used.

Also, by separating the soluble component from the insoluble component, the soluble component only can be used or the insoluble component only can be used. Furthermore, the soluble component and the insoluble component, which are separated, can be used by mixing them.

As a method for separating the soluble component from the insoluble component, for example, an extracting method with the above-mentioned organic solvent is used.

The extracting conditions are determined as needed in accordance with an organic solvent to be used and the physical properties of a crude carboxylic acid-modified lignin or the like.

When a carboxylic acid-modified lignin is used as the lignin, improvement of misting resistance can be achieved and furthermore, improvement of quick drying properties, abrasion resistance, and glossiness can be achieved.

The phenols are phenol and a derivative thereof and examples thereof include phenol; furthermore, bifunctional phenol derivatives such as o-cresol, p-cresol, p-tert-butylphenol, phenylphenol, cumylphenol, octylphenol (p-tert-octylphenol and the like), nonylphenol, and 2,4- or 2,6-xylenol; trifunctional phenol derivatives such as m-cresol, resorcinol, and 3,5-xylenol; and tetrafunctional phenol derivatives such as bisphenol A and dihydroxydiphenylmethane. Also, examples thereof include halogenated phenols that are substituted with halogen such as chlorine and bromine. These phenols may be used either singly or in combination of two or more.

As the phenols, p-tert-butylphenol, p-tert-octylphenol, and nonylphenol are preferred. From the standpoint of glossiness, single use of nonylphenol is more preferred. Also, from the standpoint of quick drying properties and misting resistance, combination of p-tert-butylphenol and nonylphenol and combination of p-tert-octylphenol and nonylphenol are more preferred.

Examples of the aldehydes include formaldehyde, paraformaldehyde, acetaldehyde, propionaldehyde, butylaldehyde (n-butylaldehyde, isobutylaldehyde), furfural, glyoxal, benzaldehyde, trioxane, and tetraoxane. A part of aldehyde may be substituted with furfuryl alcohol or the like. These aldehydes may be used either singly or in combination of two or more.

As the aldehydes, formaldehyde and paraformaldehyde are preferred.

The aldehydes can be also used as, for example, an aqueous solution. In such a case, the concentration of the aldehydes is, for example, 10 mass % or more, preferably 20 mass % or more and for example, 99 mass % or less, preferably 95 mass % or less.

Examples of the rosin-based resin include rosins and rosin derivatives.

The rosins are tall rosin, gum rosin, and wood rosin and also the concept thereof including disproportionated rosin, polymerized rosin, hydrogenated rosin, another chemically modified rosin, or a refined product thereof.

Examples of the rosin derivatives include rosin esters, unsaturated carboxylic acid-modified rosins, unsaturated carboxylic acid-modified rosin esters, rosin-modified phenols, and rosin alcohols in which a carboxyl group of the rosins or the rosins modified with an unsaturated carboxylic acid is subjected to reduction treatment.

The rosin esters can be obtained by, for example, allowing the above-mentioned rosins and polyhydric alcohol (described later) to react by a known esterification method.

In the mixing ratio of the rosins to the polyhydric alcohol (described later), the molar ratio (OH/COOH) of the hydroxyl group of the polyhydric alcohol (described later) to the carboxyl group of the rosins is, for example, 0.2 to 1.2. In the reaction of the rosins with the polyhydric alcohol (described later), the reaction temperature is, for example, 150 to 300° C. and the reaction time is, for example, 2 to 30 hours. In the reaction, a known catalyst can be blended at an appropriate proportion as needed.

The unsaturated carboxylic acid-modified rosins can be obtained by, for example, allowing α,β-unsaturated carboxylic acids to react with the above-mentioned rosins by a known method.

Examples of the α,β-unsaturated carboxylic acids include an α,β-unsaturated carboxylic acid and an anhydride thereof. Specific examples thereof include fumaric acid, maleic acid, maleic anhydride, itaconic acid, citraconic acid, citraconic anhydride, maleic anhydride, acrylic acid, and methacrylic acid. These α,β-unsaturated carboxylic acids may be used either singly or in combination of two or more.

The mixing ratio of the α,β-unsaturated carboxylic acids with respect to 1 mol of the rosins is, for example, 1 mol or less. In the reaction of the rosins with the α,β-unsaturated carboxylic acids, the reaction temperature is, for example, 150 to 300° C. and the reaction time is, for example, 1 to 24 hours. In the reaction, a known catalyst can be blended at an appropriate proportion as needed.

The unsaturated carboxylic acid-modified rosin esters can be obtained by allowing the above-mentioned polyhydric alcohol (described later) and the above-mentioned α,β-unsaturated carboxylic acids to successively or simultaneously react with the above-mentioned rosins.

When the above-mentioned components are allowed to successively react, the rosins first react with the polyhydric alcohol (described later) and thereafter, the α,β-unsaturated carboxylic acids react, or the rosins first react with the α,β-unsaturated carboxylic acids and thereafter, the polyhydric alcohol (described later) reacts. The reaction conditions in esterification reaction of the rosins with the polyhydric alcohol (described later) and those in modification reaction of the rosins with the α,β-unsaturated carboxylic acids are the same as those described above.

Examples of the rosin derivatives further include an amide compound of rosin and an amine salt of rosin.

The amide compound of rosin can be obtained by allowing the above-mentioned rosins to react with an amidating agent.

Examples of the amidating agent include a primary and/or secondary polyamine compound, a polyoxazoline compound, and a polyisocyanate compound.

The primary and/or secondary polyamine compound are/is a compound having, in a molecule, two or more primary and/or secondary amino groups and can amidate the rosins by a condensation reaction with a carboxyl group contained in the rosins. Specific examples of the polyamine compound include chain diamines such as ethylenediamine, N-ethylaminoethylamine, 1,2-propanediamine, 1,3-propanediamine, N-methyl-1,3-propanediamine, bis(3-aminopropyl) ether, 1,2-bis(3-aminopropoxy)ethane, 1,3-bis(3-aminopropoxy)-2,2-dimethylpropane, 1,4-diaminobutane, and laurylaminopropylamine; cyclic diamines such as 2-aminomethylpiperidine, 4-aminomethylpiperidine, 1,3-di (4-piperidyl)-propane, and homopiperazine; polyamines such as diethylenetriamine, triethylenetetramine, iminobispropylamine, and methyliminobispropylamine; and furthermore, a hydrohalogenic acid salt thereof.

These primary and/or secondary polyamine compounds may be used either singly or in combination of two or more.

The polyoxazoline compound is a compound having, in a molecule, two or more polyoxazoline rings and can amidate the rosins by an addition reaction with a carboxyl group contained in the rosins. An example of the polyoxazoline compound includes 2,2'-(1,3-phenylene)-bis(2-oxazoline).

These polyoxazoline compounds may be used either singly or in combination of two or more.

The polyisocyanate compound is a compound having, in a molecule, two or more isocyanate groups and can amidate the rosins by an addition condensation decarboxylation reaction with a carboxyl group contained in the rosins. Examples of the polyisocyanate compound include aromatic diisocyanates (for example, tolylene diisocyanate (2,4- or 2,6-tolylene diisocyanate or mixture thereof), phenylene diisocyanate (m- or p-phenylene diisocyanate or mixture thereof), 1,5-naphthalene diisocyanate, diphenylmethane diisocyanate (4,4'-, 2,4'-, or 2,2'-diphenylmethane diisocyanate or mixture thereof), 4,4'-toluidine diisocyanate, or the like); araliphatic diisocyanates (for example, xylylene diisocyanate (1,3- or 1,4-xylylene diisocyanate or mixture thereof), tetramethylxylylene diisocyanate (1,3- or 1,4-tetramethylxylylene diisocyanate or mixture thereof), or the like); aliphatic diisocyanates (for example, 1,3-trimethylene diisocyanate, 1,4-tetramethylene diisocyanate, 1,5-pentamethylene diisocyanate, 1,6-hexamethylene diisocyanate, or the like); alicyclic diisocyanates (for example, cyclohexane diisocyanate, 3-isocyanatomethyl-3,5,5-trimethylcyclohexyl isocyanate (isophorone diisocyanate), methylenebis (cyclohexyl isocyanate), norbornane diisocyanate, bis(isocyanatomethyl)cyclohexane, or the like); and furthermore, a derivative (for example, multimer, polyol adduct, or the like) thereof.

These polyisocyanate compounds may be used either singly or in combination of two or more.

These amidating agents may be used either singly or in combination of two or more.

In the mixing ratio of the rosins to the amidating agent, the molar ratio (active group/COOH) of the active group (primary and/or secondary amino group, polyoxazoline ring, isocyanate group) of the amidating agent to the carboxyl group of the rosins is, for example, 0.2 to 1.2. In the reaction of the rosins with the amidating agent, the reaction temperature is, for example, 120 to 300° C. and the reaction time is, for example, 2 to 30 hours. In the reaction, a known catalyst can be blended at an appropriate proportion as needed.

The amine salt of rosin can be obtained by neutralizing a carboxyl group contained in the rosins by a tertiary amine compound.

Examples of the tertiary amine compound include tri-C1 to C4 alkylamines such as trimethylamine and triethylamine and heterocyclic amines such as morpholine.

These tertiary amine compounds may be used either singly or in combination of two or more.

These rosin-based resins may be used either singly or in combination of two or more.

In this method, the rosin-based resin can be used as it is and can be also used as, for example, rosin emulsion, saponified rosin, or the like as needed.

The rosin emulsion is produced by, for example, a known emulsification method such as solvent-type emulsification method, solventless-type emulsification method, phase-transfer emulsification method, or another method.

The emulsification method is not particularly limited and can be, for example, based on the method described in paragraph numbers [0024] to [0025] in Japanese Unexamined Patent Publication No. 2008-303269.

To be specific, for example, in the solvent-type emulsification method, first, the rosin-based resin is dissolved in an organic solvent to obtain a rosin-based resin solution. Examples of the organic solvent include a chlorine-based hydrocarbon solvent such as methylenechloride; an aromatic solvent such as toluene and xylene; a ketone solvent such as methyl ketone and methyl isobutyl ketone; and another solvent capable of dissolving the rosin-based resin. Next, emulsified water obtained by mixing and dissolving an emulsifier and water is separately prepared. The emulsified water and the above-mentioned rosin-based resin solution were preliminarily mixed, so that an aqueous emulsion (preliminarily emulsified product) containing coarse particles is prepared. Thereafter, the obtained aqueous emulsion is minutely emulsified by using various mixers, a colloid mill, a high-pressure emulsification device, a high-pressure discharge-type emulsification device, a high-shear emulsification disperser, or the like to be then heated under a normal pressure or a reduced pressure, so that the organic solvent is removed.

In the solventless-type emulsification method, for example, the melted rosin-based resin and the emulsified water are preliminarily mixed under a normal pressure or under pressurization, so that an aqueous emulsion containing coarse particles is prepared. Thereafter, the obtained aqueous emulsion is minutely emulsified in the same manner as that described above by using various emulsification dispersers.

In the phase-transfer emulsification method, after the rosin-based resin is heated and melted under a normal pressure or under pressurization, emulsified water is, while being stirred, gradually added thereto, so that an oil-in-water emulsion is first obtained to be then phase-inverted to the water-in-oil emulsion. This method can be applied to either the solvent-type method or the solventless-type method.

Examples of the emulsifier used in the above-mentioned emulsification method include a nonionic emulsifier, an amphoteric emulsifier, and a synthesized polymeric emulsifier.

Examples of the nonionic emulsifier include polyoxyethylene alkyl (or alkenyl) ethers such as polyoxyethylene lauryl ether and polyoxyethylene oleyl ether; polyoxyethylene alkyl phenyl ethers such as polyoxyethylene nonyl phenyl ether and polyoxyethylene styryl phenyl ether; sorbitan higher fatty acid esters such as sorbitan monolaurate and sorbitan trioleate; polyoxyethylene sorbitan higher fatty acid esters such as polyoxyethylene sorbitan monolaurate; polyoxyethylene higher fatty acid esters such as polyoxyethylene monolaurate and polyoxyethylene monooleate; glycerin higher fatty acid esters such as monoglyceride oleate and monoglyceride stearate; and polyoxyethylene-polyoxypropylene-block copolymers.

Examples of the amphoteric emulsifier include carboxybetaine, imidazoline betaine, sulfobetaine, aminocarboxylic acid, sulfation of condensation product of ethyleneoxide and/or propyleneoxide and alkylamine or diamine, and a sulfonated adduct.

An example of the synthesized polymeric emulsifier includes an aqueous dispersion polymer obtained by allowing a polymer obtained by polymerizing two or more polymerizable monomers to form salt with, for example, alkalis such as sodium hydroxide, potassium hydroxide, and ammonia to be dispersed or solubilized in water. Examples of the polymerizable monomer include styrene, α-methylstyrene, vinyltoluene, (meth)acrylic acid, maleic acid, (meth)acrylate, acrylamide, vinyl acetate, styrenesulfonic acid, isoprenesulfonic acid, vinyl sulfonic acid, allyl sulfonic acid, and 2-(meth)acrylamide-2-methylpropane sulfonic acid. These emulsifiers may be used either singly or in combination of two or more.

These rosin emulsions may be used either singly or in combination of two or more.

In the rosin emulsion, the rosin-based resin has a solid content concentration of, for example, 0.1 mass % or more, preferably 1 mass % or more and for example, 99 mass % or less, preferably 80 mass % or less.

The saponified rosin can be obtained by saponifying a rosin-based resin with a saponification agent.

The saponification agent is not particularly limited and a known saponification agent can be used. Specific examples thereof include alkali metals such as potassium hydroxide and sodium hydroxide and ammonia. These saponification agents may be used either singly or in combination of two or more.

The saponified rosin has a saponification rate of, for example, 1% or more, preferably 10% or more and usually 100% or less.

The mixing ratio of the rosin-based resin to the saponification agent is determined as needed in accordance with the kind or the like of the rosin-based resin and the saponification agent so that the saponification rate falls within the above-mentioned range.

In the saponification reaction, the reaction temperature is, for example, 0° C. or more, preferably 10° C. or more and for example, 150° C. or less, preferably 120° C. or less. The reaction time is, for example, 1 minute or more, preferably 5 minutes or more and for example, 24 hours or less, preferably 18 hours or less.

By the reaction, a saponified rosin can be obtained.

These saponified rosins may be used either singly or in combination of two or more.

The saponified rosin can be used without using a solvent or can be used as a saponified rosin solution by being dissolved in a solvent.

The solvent is not particularly limited and examples thereof include water, alcohols, ethers, ketones, esters, aliphatic hydrocarbons, and aromatic hydrocarbons. Water, alcohols, and ethers are preferred, with water being more preferred.

These solvents may be used either singly or in combination of two or more.

In the saponified rosin solution, the saponified rosin has a solid content concentration of, for example, 1 mass % or more, preferably 5 mass % or more and for example, 99 mass % or less, preferably 80 mass % or less.

The polyhydric alcohol is an organic compound having, in a molecule, two or more hydroxyl groups and examples thereof include dihydric alcohols such as ethylene glycol, propylene glycol, neopentyl glycol, trimethylene glycol, tetramethylene glycol, 1,3-butanediol, and 1,6-hexanediol; trihydric alcohols such as glycerin, trimethylol propane, trimethylol ethane, and triethylol ethane; tetrahydric alcohols such as pentaerythritol and dipentaerythritol; and amino alcohols such as triethanolamine, tripropanolamine, triisopropanolamine, N-isobutyl diethanolamine, and N-normal-butyl diethanolamine. These polyhydric alcohols may be used either singly or in combination of two or more.

As the polyhydric alcohol, trihydric alcohols and tetrahydric alcohols are preferred, with glycerin and pentaerythritol being more preferred and glycerin being further more preferred.

By allowing the lignin, the phenols, the aldehydes, the rosin-based resin, and the polyhydric alcohol to react, a resin for ink can be obtained.

In the preparation of the resin for ink, for example, the above-mentioned components (lignin, phenols, aldehydes, rosin-based resin, and polyhydric alcohol) are collectively formulated to be heated and pressurized, so that they can react. Or, the above-mentioned components are successively formulated to be heated and pressurized, so that they can also react.

From the standpoint of equipment cost and production cost, preferably, the above-mentioned components are successively formulated to react.

In such a case, to be specific, first, by allowing the lignin, the phenols, and the aldehydes to react, a lignin-containing resol-type phenolic resin is prepared and next, the obtained lignin-containing resol-type phenolic resin, the rosin-based resin, and the polyhydric alcohol are allowed to react.

In the preparation of the lignin-containing resol-type phenolic resin, preferably, first, the lignin reacts with the phenols under the presence of an acid catalyst.

Examples of the acid catalyst include an organic acid and an inorganic acid.

Examples of the organic acid include sulfonic acid compounds such as methanesulfonic acid, p-toluenesulfonic acid, dodecylbenzenesulfonic acid, cumenesulfonic acid, dinonyl naphthalenemonosulfonic acid, and dinonyl naphthalenedisulfonic acid; phosphate esters having a C1 to C18 alkyl group such as trimethyl phosphate, triethyl phosphate, monobutyl phosphate, dibutyl phosphate, tributyl phosphate, and trioctyl phosphate; and carboxylic acids such as formic acid, acetic acid, oxalic acid, maleic acid, and succinic acid.

Examples of the inorganic acid include phosphoric acid, hydrochloric acid, sulfuric acid, and nitric acid.

These acid catalysts may be used either singly or in combination of two or more.

As the acid catalyst, an inorganic acid is preferred, with sulfuric acid being more preferred.

The mixing ratio of the phenols with respect to 100 parts by mass of the lignin is, for example, 50 parts by mass or more, preferably 150 parts by mass or more, more preferably 200 parts by mass or more, further more preferably 400 parts by mass or more and for example, 1500 parts by mass or less, preferably 800 parts by mass or less.

In other words, the mass ratio (phenols/lignin) of the phenols to the lignin is, for example, 0.5 or more, preferably 1.5 or more, more preferably 2.0 or more, further more preferably 4.0 or more and for example, 15 or less, preferably 8 or less.

When the mass ratio of the phenols to the lignin falls within the above-mentioned range, improvement of solubility of the resin for ink in a solvent or vegetable oil (described later) can be achieved.

The mixing ratio of the acid catalyst with respect to 100 parts by mass of the lignin is, for example, 0.1 part by mass or more, preferably 1 part by mass or more and for example, 10 parts by mass or less, preferably 5 parts by mass or less.

With regard to reaction conditions, the reaction temperature is, for example, 70° C. or more, preferably 110° C. or more and for example, 180° C. or less, preferably 150° C. or less under the atmospheric pressure.

The reaction time is, for example, 0.5 hour or more, preferably 1 hour or more and for example, 10 hours or less, preferably 5 hours or less.

In this manner, the lignin is modified with the phenols, so that a phenol-modified lignin is obtained.

Next, in this method, the obtained reaction product (that is, phenol-modified lignin) reacts with the aldehydes under the presence of an alkali catalyst.

An example of the alkali catalyst includes hydroxides such as sodium hydroxide, potassium hydroxide, calcium hydroxide, barium hydroxide, and magnesium hydroxide. Examples thereof further include aliphatic amines such as dimethylamine, triethylamine, butylamine, dibutylamine, tributylamine, diethylenetriamine, and dicyandiamide; araliphatic amines such as N,N-dimethylbenzylamine; aromatic amines such as aniline and 1,5-naphthalenediamine; ammonia; in addition, naphthenic acids of divalent metal; and hydroxides of divalent metal. These alkali catalysts may be used either singly or in combination of two or more.

As the alkali catalyst, sodium hydroxide is preferred.

The mixing ratio of the aldehydes with respect to 100 parts by mass of the phenols is, for example, 15 parts by mass or more, preferably 20 parts by mass or more and for example, 100 parts by mass or less, preferably 40 parts by mass or less.

The mixing ratio of the alkali catalyst with respect to 100 parts by mass of the phenols is, for example, 0.01 part by mass or more, preferably 0.05 part by mass or more and for example, 5.0 parts by mass or less, preferably 2.0 parts by mass or less.

With regard to reaction conditions, the reaction temperature is, for example, 30° C. or more, preferably 50° C. or more and for example, 200° C. or less, preferably 100° C. or less under the atmospheric pressure.

The reaction time is, for example, 1 hour or more, preferably 3 hours or more and for example, 15 hours or less, preferably 10 hours or less.

In this manner, a lignin-containing resol-type phenolic resin is obtained.

The method of obtaining the lignin-containing resol-type phenolic resin is not limited to the above-mentioned method. The lignin, the phenols, and the aldehydes can be also collectively formulated to allow them to collectively react under the presence of the above-mentioned alkali catalyst.

In such a case, the mixing ratio of the phenols with respect to 100 parts by mass of the lignin is, for example, 50 parts by mass or more, preferably 190 parts by mass or more and for example, 1500 parts by mass or less, preferably 770 parts by mass or less.

The mixing ratio of the aldehydes with respect to 100 parts by mass of the phenols is, for example, 15 parts by mass or more, preferably 20 parts by mass or more and for example, 100 parts by mass or less, preferably 40 parts by mass or less.

The mixing ratio of the alkali catalyst with respect to 100 parts by mass of the phenols is, for example, 0.01 part by mass or more, preferably 0.05 part by mass or more and for example, 5.0 parts by mass or less, preferably 2.0 parts by mass or less.

With regard to reaction conditions, the reaction temperature is, for example, 30° C. or more, preferably 50° C. or more and for example, 200° C. or less, preferably 100° C. or less under the atmospheric pressure.

The reaction time is, for example, 1 hour or more, preferably 3 hours or more and for example, 15 hours or less, preferably 10 hours or less.

In this manner, a lignin-containing resol-type phenolic resin is obtained.

In the preparation of the lignin-containing resol-type phenolic resin, preferably, first, the lignin reacts with the phenols under the presence of an acid catalyst. Thereafter, the obtained reaction product (the phenol-modified lignin) reacts with the aldehydes under the presence of an alkali catalyst.

According to this method, first, the lignin is modified with the phenols, so that the reactivity of the lignin can be improved and improvement of production efficiency of the lignin-containing resol-type phenolic resin can be achieved.

Next, in this method, the obtained lignin-containing resol-type phenolic resin, the rosin-based resin, and the polyhydric alcohol are allowed to react, so that a resin for ink is obtained.

In the preparation of the resin for ink, preferably, first, the lignin-containing resol-type phenolic resin obtained in the above-mentioned manner reacts with the rosin-based resin.

The mixing ratio of the rosin-based resin with respect to 100 parts by mass of the lignin-containing resol-type phenolic resin is, for example, 20 parts by mass or more, preferably 100 parts by mass or more and for example, 1000 parts by mass or less, preferably 300 parts by mass or less.

With regard to reaction conditions, the reaction temperature is, for example, 150° C. or more, preferably 200° C. or more and for example, 280° C. or less, preferably 230° C. or less under the atmospheric pressure.

The reaction time is, for example, 0.5 hour or more, preferably 1 hour or more and for example, 5 hours or less, preferably 3 hours or less.

Next, in this method, polyhydric alcohol is further added to the obtained mixture to allow them to react.

The mixing ratio of the polyhydric alcohol with respect to 100 parts by mass of the lignin-containing resol-type phenolic resin is, for example, 7 parts by mass or more, preferably 10 parts by mass or more and for example, 25 parts by mass or less, preferably 22 parts by mass or less.

With regard to reaction conditions, the reaction temperature is, for example, 150° C. or more, preferably 200° C. or more and for example, 350° C. or less, preferably 300° C. or less under the atmospheric pressure.

The reaction time is, for example, 1 hour or more, preferably 3 hours or more and for example, 30 hours or less, preferably 20 hours or less.

In this manner, a resin for ink is obtained.

The method of obtaining the resin for ink is not limited to the above-mentioned method. The lignin-containing resol-type phenolic resin, the rosin-based resin, and the polyhydric alcohol can be also collectively formulated to allow them to react.

In such a case, the mixing ratio of the rosin-based resin with respect to 100 parts by mass of the lignin-containing resol-type phenolic resin is, for example, 20 parts by mass or more, preferably 100 parts by mass or more and for example, 1000 parts by mass or less, preferably 300 parts by mass or less.

The mixing ratio of the polyhydric alcohol with respect to 100 parts by mass of the lignin-containing resol-type phenolic resin is, for example, 7 parts by mass or more, preferably 10 parts by mass or more and for example, 25 parts by mass or less, preferably 22 parts by mass or less.

With regard to reaction conditions, the reaction temperature is, for example, 150° C. or more, preferably 200° C. or more and for example, 350° C. or less, preferably 300° C. or less under the atmospheric pressure.

The reaction time is, for example, 1 hour or more, preferably 3 hours or more and for example, 30 hours or less, preferably 20 hours or less.

In this manner, a resin for ink is obtained.

In the preparation of the resin for ink, a catalyst may be added as needed.

An example of the catalyst includes a known esterification catalyst. Specific examples thereof include metal oxides such as zinc oxide, magnesium oxide, and calcium oxide and known acid catalysts such as Broensted acid and Lewis acid.

As the catalyst, metal oxides are preferred, with zinc oxide being more preferred.

The mixing ratio of the catalyst with respect to 100 parts by mass of the rosin-based resin is, for example, 0.05 part by mass or more, preferably 0.2 part by mass or more and for example, 2.5 parts by mass or less, preferably 1.0 part by mass or less.

According to the resin for ink, excellent printing properties are ensured and improvement of misting resistance can be achieved. Furthermore, according to the above-mentioned resin for ink, excellent glossiness can be obtained.

Thus, the resin for ink can be preferably used in ink such as printing ink.

The ink contains the above-mentioned resin for ink. To be more specific, the ink contains, a varnish containing the above-mentioned resin for ink, vegetable oil, and a solvent and colorant.

Examples of the vegetable oil include drying oils such as linseed oil, tung oil, and safflower oil; semi-drying oils such as soybean oil, rapeseed oil, and corn oil; non-drying oils such as castor oil and olive oil; synthetic drying oils such as dehydrated castor oil and thermal polymerization oil; mixtures thereof; and reclaimed oils.

These vegetable oils may be used either singly or in combination of two or more.

As the vegetable oil, semi-drying oils are preferred, with soybean oil being more preferred.

Examples of the solvent include aliphatic hydrocarbon solvents such as hexane, heptane, octane, nonane, and decane; aromatic hydrocarbon solvents such as benzene, toluene, and xylene; and petroleum solvents such as paraffin-based solvent, naphthene-based solvent, and aroma-based solvent.

A commercially available solvent can be also used. Specific examples thereof include AF Solvent No. 4, AF Solvent No. 5, AF Solvent No. 6, AF Solvent No. 7, No. 6 Solvent, and Ink Oil 35 (hereinbefore, products of JX Nippon Oil & Energy Corporation).

These solvents may be used either singly or in combination of two or more.

In the varnish, with respect to 100 parts by mass of the total amount of the resin for ink, the vegetable oil, and the solvent, the mixing ratio of the resin for ink is, for example, 20 to 60 parts by mass; the mixing ratio of the vegetable oil is, for example, 20 to 40 parts by mass; and the mixing ratio of the solvent is, for example, 20 to 40 parts by mass.

The varnish can contain a known resin for ink (petroleum resin, alkyd resin, gilsonite resin, and the like) without impairing the excellent advantages of the invention.

In such a case, the content ratio of the known resin for ink with respect to 100 parts by mass of the above-mentioned resin for ink is, for example, 20 parts by mass or less, preferably 10 parts by mass or less.

The varnish can contain a gelling agent as needed. The varnish is prepared as a gel varnish by containing the gelling agent.

Examples of the gelling agent include aluminum ethyl-acetoacetate diisopropylate, aluminum tris(ethylacetoacetate), aluminum isopropylate, aluminum stearate, and aluminum octylate.

These gelling agents may be used either singly or in combination of two or more.

Examples of the colorant include an organic pigment and an inorganic pigment.

Examples of the organic pigment include soluble azo pigments such as Lake Red C and brilliant carmine 6B; insoluble azo pigments such as allylide pigment, acetoacetic acid allylide disazo pigment, and pyrazolone pigment; and polycyclic and heterocyclic pigments such as copper phthalocyanine blue, sulfonated copper phthalocyanine blue, quinacridon pigment, dioxazine pigment, pyranthrone pigment, industron pigment, thioindigo pigment, anthraquinone pigment, perinone pigment, metal complex pigment, and quinophthalone pigment.

Examples of the inorganic pigment include carbon black, titanium oxide, calcium carbonate, zinc white, Prussian blue, ultramarine blue, and red oxide.

These colorants may be used either singly or in combination of two or more.

The colorant is appropriately selected, depending on the using purpose and intended use. When the above-mentioned resin for ink is black, black pigment is preferably selected. An example of the black pigment includes carbon black.

In the ink, with respect to 100 parts by mass of the total amount of the varnish and the colorant, the mixing ratio of the varnish is, for example, 70 to 90 parts by mass and the mixing ratio of the colorant is, for example, 10 to 30 parts by mass.

The ink can contain an additive as needed.

Examples of the additive include antiskinning agents, wax compounds, flame retardants, fillers, and stabilizers.

These additives may be used either singly or in combination of two or more. The content of the additive is appropriately set, depending on the using purpose and intended use, without impairing the excellent advantages of the invention.

The additive may be, for example, added to the above-mentioned varnish; it may be mixed with the pigment; it may be simultaneously added at the time of mixing of the varnish and the pigment; or furthermore, it may be separately added to the mixture of the varnish and the pigment.

The ink thus obtained contains the above-mentioned resin for ink, so that it is excellent in printing properties and misting resistance.

In other words, the concentration of the above-mentioned ink is adjusted by the above-mentioned vegetable oil and solvent so as to satisfy the printing properties. In a case where the viscosity and the tackiness (stickiness) are adjusted, the above-mentioned ink has excellent misting resistance.

From the standpoint of printing properties, the ink has a viscosity at 25° C. of, for example, 4 Pa·s or more, preferably 10 Pa·s or more and for example, 200 Pa·s or less, preferably 150 Pa·s or less.

The viscosity can be measured in accordance with JIS K-5701 (2000 edition).

The ink has a tack value (400 rpm) of, for example, 4 or more, preferably 4.5 or more and for example, 9.5 or less, preferably 8 or less.

The tack value can be measured in accordance with JIS K-5701 (2000 edition).

When the viscosity and the tackiness (stickiness) are adjusted within the above-mentioned range, the above-mentioned ink is excellent in misting resistance and furthermore, excellent in quick drying properties, abrasion resistance, and glossiness.

Thus, the above-mentioned ink is preferably used as printing ink in offset printing or the like.

EXAMPLES

The invention will hereinafter be described based on Examples and Comparative Examples. The invention is however not limited by the following Examples. All designations of "part" or "parts" and "%" mean part or parts by mass and % by mass, respectively, unless otherwise particularly specified. The specific numerical values in mixing ratio (content ratio), property value, and parameter used in the following description will be replaced with upper limits (numerical values defined as "or less" or "below") or lower limits (numerical values defined as "or more" or "above") of corresponding numerical values in mixing ratio (content ratio), property value, and parameter described in the above-mentioned "Embodiment of the Invention".

<Production of Acetic Acid-Modified Lignin>

PRODUCTION EXAMPLE 1

Corn stover (100 parts by mass) was mixed with 1000 parts by mass of 95 mass % acetic acid and 3 parts by mass of sulfuric acid. The resulting mixture was allowed to react for 4 hours under reflux. After the reaction, the reaction mixture thus obtained was filtered to remove pulp and collect a pulp waste liquor. Then, acetic acid was removed from the pulp waste liquor by using a rotary evaporator. After concentration to reduce its volume to 1/10, water was added to the concentrate in an amount 10 times the concentrate (on a mass basis), followed by filtration to obtain an acetic acid-modified lignin as a solid component.

The phenolic hydroxyl group equivalent of the obtained acetic acid-modified lignin was 435.9 g/eq.

The phenolic hydroxyl group equivalent was obtained in the following manner.

That is, first, 10 mg of an acetic acid-modified lignin sample was dissolved in 10 mL of 2-methoxyethanol/water (1/1, w/w) to obtain a reference sample.

Next, 1 mL of the reference sample was diluted with 2-methoxyethanol/water (1/1, w/w) to obtain 10 mL thereof and the obtained sample was defined as Sample 1.

Furthermore, 1 mL of the reference sample was diluted with 2-methoxyethanol/2N sodium hydroxide aqueous solution (1/1, w/w) to obtain 10 mL thereof and the obtained sample was defined as Sample 2.

The two samples (Sample 1 and Sample 2) thus obtained were subjected to the spectrometry shown in the following.

To be more specific, first, 2-methoxyethanol/water (1/1, w/w) was put into the front and back cells to obtain the base line. Next, Sample 1 was set at the reference side and Sample 2 was set at the sample side to measure the absorption (absorbance) at 296 nm and 366 nm.

The absorption (absorbance) at 296 nm was caused by a structure of the following formula (1) and the molar absorptivity as for the phenolic hydroxyl group concentration was 4100 L/(mol·cm).

The absorption (absorbance) at 366 nm was caused by a structure of the following formula (2) and the molar absorptivity as for the phenolic hydroxyl group concentration was 37250 L/(mol·cm).

Then, the phenolic hydroxyl group concentration in the sample was obtained from the absorption (absorbance) and the molar absorptivity at the above-mentioned two wavelengths and the obtained values were converted to the phenolic hydroxyl group equivalent.

[Chemical Formula 1]

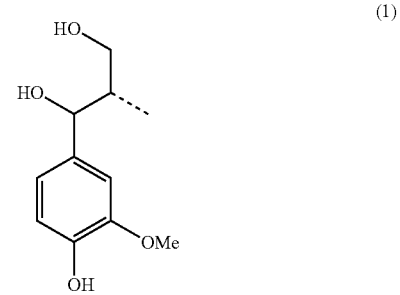

(1)

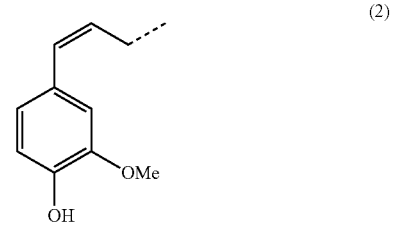

(2)

<Production of Unmodified Lignin>

PRODUCTION EXAMPLE 2

A pulp waste liquor (black liquor) obtained by alkali digestion of wheat straws was neutralized, followed by filtration to obtain an unmodified lignin as a solid component.

<Preparation of Resin for Ink>

EXAMPLE 1

Synthesis of Lignin-Containing Resol-Type Phenolic Resin (Presence of Phenol Modification of Lignin)

Nonylphenol (616 g (2.8 mol)) was put into a 1 L-flask under a room temperature to be stirred at 250 rpm. Next, 60 g (0.4 mol) of the acetic acid-modified lignin obtained in Production Example 1 was added and then, 2.4 g of concentrated sulfuric acid (98% solution) was added thereto. Then, the temperature of the resulting mixture was increased until 130° C., a drain pipe was attached, and the obtained mixture was allowed to react under a nitrogen atmosphere for 2.5 hours. In this manner, a phenol-modified lignin was obtained.

Thereafter, the temperature of the phenol-modified lignin was decreased until 50° C., 182.6 g of paraformaldehyde (92% solution) was added, and then, 4.4 g of sodium hydroxide was added thereto. After the temperature was increased until 95° C. at a temperature increasing rate of 1.0° C./min, the resulting mixture was allowed to react at 95° C. at 250 rpm for 5 hours.

In this manner, a lignin-containing resol-type phenolic resin was obtained.

Preparation of Resin for Ink

Chinese gum rosin (515 g) was put into a 1 L-reaction flask to be then heated and gradually melted, while the stirring rate was gradually increased until 250 rpm. After the temperature of the Chinese gum rosin was increased until 210° C., 10.3 g of maleic anhydride was added thereto to allow them to react for 30 minutes. In this manner, an unsaturated carboxylic acid-modified rosin was obtained.

Next, 2.6 g of zinc oxide was added and next, 360 g of the above-mentioned lignin-containing resol-type phenolic resin was added dropwise thereto at a dropping rate of 3 ml/min over 2 hours with a dropping funnel.

Thereafter, 57 g of glycerin was added thereto and the temperature of the resulting mixture was increased until 250° C. at a temperature increasing rate of 0.3° C./min. Furthermore, the mixture was allowed to react at 250° C. for 5 hours.

In this manner, a resin for ink was obtained.

EXAMPLES 2 TO 3

A lignin-containing resol-type phenolic resin was synthesized in the same manner as in Example 1 except that the mixing formulation of the components was changed to that shown in Table 1. Thereafter, a resin for ink was prepared in the same manner as in Example 1.

EXAMPLE 4

Synthesis of Lignin-Containing Resol-Type Phenolic Resin (Absence of Phenol Modification of Lignin)

Nonylphenol (616 g (2.8 mol)) was put into a 1 L-flask under a room temperature to be stirred at 250 rpm. Next, 60 g (0.4 mol) of the acetic acid-modified lignin obtained in Production Example 1 was added thereto and the temperature of the resulting mixture was increased until 50° C.

Thereafter, 182.6 g of paraformaldehyde was added and then, 2.5 g of sodium hydroxide was added thereto. After the temperature was increased until 95° C. at a temperature increasing rate of 1.0° C./min, the resulting mixture was allowed to react at 95° C. for 5 hours.

In this manner, a lignin-containing resol-type phenolic resin was obtained.

Preparation of Resin for Ink

A resin for ink was obtained in the same manner as in Example 1 except that the mixing formulation of the components was changed to that shown in Table 1 by using the above-mentioned lignin-containing resol-type phenolic resin.

EXAMPLE 5

A lignin-containing resol-type phenolic resin was synthesized in the same manner as in Example 1 except that the mixing formulation of the components was changed to that shown in Table 1 by using the unmodified lignin obtained in Production Example 2 instead of the acetic acid-modified lignin. Thereafter, a resin for ink was prepared in the same manner as in Example 1.

EXAMPLE 6

A lignin-containing resol-type phenolic resin was synthesized in the same manner as in Example 4 except that the mixing formulation of the components was changed to that shown in Table 1 by using the unmodified lignin obtained in Production Example 2 instead of the acetic acid-modified lignin. Thereafter, a resin for ink was prepared in the same manner as in Example 4.

EXAMPLE 7

A lignin-containing resol-type phenolic resin was synthesized in the same manner as in Example 1 except that 308 g (1.4 mol) of nonylphenol and 308 g of p-tert-octylphenol (1:1 in mass ratio) were used instead of 616 g (2.8 mol) of nonylphenol. Thereafter, a resin for ink was prepared in the same manner as in Example 1.

EXAMPLE 8

A lignin-containing resol-type phenolic resin was synthesized in the same manner as in Example 1 except that 308 g of nonylphenol and 308 g of p-tert-butylphenol (1:1 in mass ratio) were used instead of 616 g of nonylphenol. Thereafter, a resin for ink was prepared in the same manner as in Example 1.

COMPARATIVE EXAMPLE 1

Synthesis of Non-Lignin Resol-Type Phenolic Resin

Nonylphenol (700 g (2.8 mol)) was put into a 1 L-flask under a room temperature to be stirred at 250 rpm. Next, after the temperature of the nonylphenol was increased until 50° C., 207.5 g of paraformaldehyde was added and then, 2.8 g of sodium hydroxide was added thereto. After the temperature was increased until 95° C. at a temperature increasing rate of 1.0° C./min, the resulting mixture was allowed to react at 95° C. for 5 hours.

Preparation of Resin for Ink

Chinese gum rosin (540 g) was put into a 1 L-reaction flask to be then heated and gradually melted, while the stirring rate was gradually increased until 250 rpm. After the temperature of the Chinese gum rosin was increased until 210° C., 10.8 g of maleic anhydride was added thereto to allow them to react for 30 minutes. In this manner, an unsaturated carboxylic acid-modified rosin was obtained.

Next, 2.7 g of zinc oxide was added and next, 360 g of the above-mentioned non-lignin resol-type phenolic resin was added dropwise thereto at a dropping rate of 3 ml/min over 2 hours with a dropping funnel.

Thereafter, 59.8 g of glycerin was added thereto and the temperature of the resulting mixture was increased until 250° C. at a temperature increasing rate of 0.3° C./min. Furthermore, the mixture was allowed to react at 250° C. for 5 hours.

In this manner, a resin for ink was obtained.

Furthermore, a varnish or AF Solvent No. 6 was added thereto so that the tack value thereof at 400 rpm was 4 to 5 with an incometer (product of TOYO SEIKI SEISAKU-SHO, LTD.).

In this manner, ink was prepared.

TABLE 1

| | No. | Comp. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Lignin | Kind | — | Production Ex. 1 | | | | Production Ex. 2 | | Production Ex. 1 | |
| | Phenol Modification | — | Presence | | | Absence | Presence | Absence | Presence | |
| Resol Resin | | | | | | | | | | |
| Mixing Formulation (g) | Nonylphenol | 700 | 616 | 577.5 | 481.3 | 616 | 616 | 616 | 308 | 308 |
| | p-octylphenol | — | — | — | — | — | — | — | 308 | — |
| | p-tert-butylphenol | — | — | — | — | — | — | — | — | 308 |
| | Lignin | — | 80 | 150 | 250 | 80 | 80 | 80 | 80 | 80 |
| | 98% Concentrated Sulfuric Acid | — | 2.4 | 4.5 | 7.5 | — | 2.4 | — | 2.4 | 2.4 |
| | 92% Paraformaldehyde | 207.5 | 182.6 | 171.2 | 142.7 | 182.6 | 182.6 | 182.6 | 182.6 | 182.6 |
| | Sodium Hydroxide | 2.5 | 4.4 | 6 | 8.1 | 2.5 | 4.4 | 2.5 | 4.4 | 4.4 |
| Ink Resin | | | | | | | | | | |
| Mixing Formulation (g) | Resol Resin | 360 | 360 | 360 | 360 | 360 | 360 | 360 | 360 | 360 |
| | Chinese Gum Rosin | 540 | 515 | 515 | 515 | 515 | 515 | 515 | 515 | 515 |
| | Maleic Anhydride | 10.8 | 10.3 | 10.3 | 10.3 | 10.3 | 10.3 | 10.3 | 10.3 | 10.3 |
| | Glycerin | 59.8 | 57 | 57 | 57 | 57 | 57 | 57 | 57 | 57 |
| | Zinc Oxide | 2.7 | 2.6 | 2.6 | 2.6 | 2.6 | 2.6 | 2.6 | 2.6 | 2.6 |
| Phenols/Lignin (Mass Ratio) | | — | 7.7 | 3.9 | 1.9 | 7.7 | 7.7 | 7.7 | 7.7 | 7.7 |

In Table, "Lignin" represents an acetic acid-modified lignin or an unmodified lignin. "Resol Resin" represents a lignin-containing resol-type phenolic resin or a non-lignin resol-type phenolic resin.

EXAMPLES 9 TO 16 AND COMPARATIVE EXAMPLE 2

A varnish and ink were prepared by using each of the resins for ink obtained in Examples 1 to 8 and Comparative Example 1 in the following method.

Preparation of Varnish

Soybean oil (soybean refined oil) (54 g) and 45 g of resin for ink were added, while being stirred, to a 250 ml-reaction flask under a room temperature. The stirring rate was 200 rpm.

Next, the temperature of the resulting mixture was increased until 100° C. and immediately after heating, 1 g of gelling agent (Kelope EP-2, ethyl acetoacetate aluminum diisopropylate, product of Hope Chemical Co., LTD.) was added thereto.

Thereafter, the temperature of the obtained mixture was increased until 180° C. over 30 minutes to be further heated at 180° C. for 1 hour.

Then, the temperature thereof was decreased until 120° C. to take a sample and the viscosity thereof was measured with a TV-20 EHD-type viscometer (product of TOKI SANGYO CO., LTD.).

Soybean oil (soybean refined oil) was added thereto so that the viscosity of the sample was about 100±20 Pa·s.

Preparation of Ink

With respect to 70 g of the above-mentioned varnish, 18 g of neutral carbon (carbon black) and 2 g of AF Solvent No. 6 (solvent, product of JX Nippon Oil & Energy Corporation) were added to be dispersed with a three-roll.

<Evaluation>

The properties of each of the ink obtained in Examples and Comparative Examples were evaluated using the following methods. The results are shown in Table 2.

(1) Misting Resistance

Ink (2.8 ml) was applied to a roll of a misting tester (product of TOYO SEIKI SEISAKU-SHO, LTD.) and the roll was rotated at 1000 rpm for 1 minute. The scattered state of the ink on the lower surface of the roll and on the white paper placed near the roll was observed and visually evaluated by 10 steps (1: Bad to 10: Good).

(2) Quick Drying Properties

Ink (0.1 ml) was spread on a coating paper with a three-part roll of RI-II type printing tester (product of IHI Machinery and Furnace Co., Ltd.). After the spreading, the spread object was cut into a piece having a width of about 1 cm and the printed surface thereof was attached to another coating paper.

As for the sample, the time (minute) until the ink was not attached to the coating paper was measured.

(3) Gloss Value and Abrasion Resistance

Ink (0.2 ml) was spread on a coating paper with a two-part roll of RI-II type printing tester (product of IHI Machinery and Furnace Co., Ltd.). After the spreading, the sample was allowed to stand still at 25° C. for 24 hours.

Thereafter, the gloss value thereof was measured at a measurement angle of 60° with a micro-TRI-gloss glossmeter (product of BYK-Gardner GmbH).

Next, a friction test was performed in accordance with the method in JIS K 5701-1 (2000)-P16 with an S-type friction tester to measure the abrasion resistance.

The number of friction was set to 20 times and the obtained results were visually evaluated by 10 steps (1: Bad to 10: Good).

TABLE 2

| | No. | Comp. Ex. 2 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| | Ink Resin | Comp. Ex. 1 | Ex. 1 | Ex. 2 | Ex. 3 | Ex. 4 | Ex. 5 | Ex. 6 | Ex. 7 | Ex. 8 |
| Lignin | Kind | — | | Producction Ex. 1 | | | Production Ex. 2 | | Production Ex. 1 | |
| | Phenol Modification | — | | Presence | | Absence | Presence | Absence | Presence | |
| | Kind of Phenols | NP | NP | NP | NP | NP | NP | NP | NP/POP (Mass Ratio: 1/1) | NP/PTBP (Mass Ratio: 1/1) |
| | Phenols/Lignin (Mass Ratio) | — | 7.7 | 3.9 | 1.9 | 7.7 | 7.7 | 7.7 | 7.7 | 7.7 |
| | Tack Value (400 rpm) | 5.1 | 6 | 5.5 | 4.7 | 5.5 | 4.8 | 4.8 | 4.6 | 5 |
| Evaluation | Misting Resistance (1: Bad to 10: Good) | 4 | 8 | 8 | 9 | 7 | 5 | 5 | 9 | 10 |
| | Quick Drying Properties (min) | 15 | 7 | 15 | 22 | 11 | 30 | >60 | 5 | 4 |
| | Abrasion Resistance (1: Bad to 10: Good) | 6 | 7 | 4 | 2 | 5 | 3 | 4 | 7 | 7 |
| | Gloss Value | 78 | 77 | 71 | 72 | 71 | 58 | 56 | 70 | 63 |

The details of abbreviations are shown below.
NP: nonylphenol
POP: p-tert-octylphenol
PTBP: p-tert-butylphenol While the illustrative embodiments of the present invention are provided in the above description, such are for illustrative purpose only and are not to be construed as limiting in any manner. Modification and variation of the present invention that will be obvious to those skilled in the art are to be covered by the following claims.

INDUSTRIAL APPLICABILITY

The resin for ink and ink of the present invention are preferably used, for example, in printing ink in various printing fields such as offset printing.

The invention claimed is:

1. A method for producing a resin for ink, the method comprising:
   reacting a lignin, a phenol, and an aldehyde so as to obtain a lignin-containing resol phenolic resin,
   reacting the obtained lignin-containing resol phenolic resin with a rosin-based resin, and a polyhydric alcohol, and
   producing the lignin-containing resol phenolic resin by allowing a phenol-modified lignin obtained after allowing the lignin to react with the phenol under the presence of an acid catalyst to react with the aldehyde under the presence of an alkali catalyst.

2. The method for producing a resin for ink according to claim 1, wherein the lignin is modified with acetic acid.

* * * * *